(12) United States Patent
Grimes

(10) Patent No.: US 6,377,822 B1
(45) Date of Patent: Apr. 23, 2002

(54) WIRELESS TELEPHONE FOR VISUALLY DISPLAYING PROGRESS MESSAGES

(75) Inventor: Gary J. Grimes, Birmingham, AL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/301,472

(22) Filed: Apr. 28, 1999

(51) Int. Cl.[7] ................................................. H04M 1/00
(52) U.S. Cl. ........................ 455/566; 455/412; 455/413
(58) Field of Search .............................. 455/412, 413, 455/414, 31.2, 550, 556, 557, 566; 704/235, 260; 379/67.1, 88.01, 88.07, 88.14, 88.15

(56) References Cited

U.S. PATENT DOCUMENTS

| | | | |
|---|---|---|---|
| 5,177,780 A | * 1/1993 | Kasper et al. | ............... 455/413 |
| 5,475,798 A | * 12/1995 | Handlos | |
| 5,724,410 A | * 3/1998 | Parvulescu et al. | ...... 379/88.18 |
| 5,774,857 A | * 6/1998 | Newlin | ........................ 704/271 |
| 6,067,516 A | * 5/2000 | Levay et al. | ................. 704/244 |
| 6,138,096 A | * 10/2000 | Chan et al. | .................. 704/235 |
| 6,151,572 A | * 11/2000 | Cheng et al. | ................ 704/235 |

FOREIGN PATENT DOCUMENTS

| | | | | |
|---|---|---|---|---|
| EP | 0776097 A2 | * 5/1997 | ............ | H04B/1/38 |
| WO | WO 98/05154 | * 7/1997 | ............ | H04M/3/50 |

* cited by examiner

*Primary Examiner*—Nay Maung
*Assistant Examiner*—Sonny Trinh
(74) *Attorney, Agent, or Firm*—John C. Moran

(57) ABSTRACT

Detecting the presence of progress tones or progress audio messages and converting these tones or audio messages to a text form that is then displayed on a wireless telephone. This capability frees the user of the wireless telephone from having to place the wireless telephone to their ear and then, lower it to actuate the keypad when contacting a service provided by a remote communication system. A digital signal processor (DSP) is utilized to detect the progress tone and to convert audio messages to text using speech to text techniques. The operations of the DSP are controlled by the user performing operations on the keypad of the wireless telephone.

3 Claims, 2 Drawing Sheets

WIRELESS TELEPHONE FOR VISUALLY DISPLAYING PROGRESS MESSAGES

TECHNICAL FIELD

The present invention relates to wireless telecommunication handsets, and, in particular, to visual display of progress tones and progress audio messages.

BACKGROUND OF THE INVENTION

The use of wireless telephones connected both to cellular systems and in-house wireless systems has increased dramatically in recent years. One factor for this dramatic increase in the utilization of wireless telephones has been that the size of the wireless telephones has decreased. The smaller wireless telephones are easier to carry. However, the decreased size has made the wireless telephones more difficult to utilize in certain circumstances. One circumstance is when a wireless telephone is being used to access voice messages stored on a voice mail system. First, the user has to dial the voice mail system, listen for an audio message requesting the telephone number of the user, enter the telephone number, listen for the message requesting the user's password, and enter the password. This results in the user having to (1) dial the voice mail system utilizing the keypad of the wireless telephone, (2) put the wireless telephone back to the user's ear, (3) upon hearing the message requesting the user's telephone number, remove the telephone from the user's ear and dial in the telephone number utilizing the keypad of the wireless telephone, (4) put the wireless telephone back to the user's ear and listen for the message requesting the password, and (5) when the message requesting the password is received, the user must remove the wireless telephone from the user's ear and enter the password utilizing the keypad of the wireless telephone. This procedure at best is unpleasant, and, at times, difficult to perform.

Another circumstance is when utilizing a wireless telephone with a feature provided by business telecommunication systems called Remote Access. Remote Access feature allows a user to dial a special telephone number on the business telephone switching system, enter a password, and then, dial a long distance call via the business telecommunication system. The purpose of the Remote Access feature is to allow users to utilize the long distance billing rates charged to the business telecommunication system. Once again, to utilize the Remote Access feature, requires listening for progress tones and/or audio messages and entering codes or telephone numbers via the keypad of the wireless telephone. The end result is that the user is constantly listening and then having to remove the wireless telephone from the ear so as to enter the required input on the keypad on the wireless telephone.

A prior art solution to these problems is provided by wireless telephones that have a built-in speaker phone capability. When accessing a voice mail system or remote access feature, the user uses the speaker phone capability of the wireless telephone so that the user does not have to put the wireless telephone to their ear. The problem with this solution is that often the user wants to access a voice mail system or remote access feature while in a public place and does not wish to utilize the speaker phone capability of the wireless telephone.

SUMMARY OF THE INVENTION

The foregoing problems are solved and a technical advance is achieved by a wireless telephone and method that detect the presence of progress tones or progress audio messages and convert these tones or audio messages to a text form that is then displayed on the wireless telephone. This capability frees the user of the wireless telephone from having to place the wireless telephone to their ear when contacting a service provided by a remote communication system. A digital signal processor (DSP) is utilized to detect the progress tone and to convert audio messages to text using speech to text techniques. The operations of the DSP are controlled by the user performing operations on the keypad of the wireless telephone.

Other and further aspects of the present invention will become apparent during the course of the following description and by reference to the accompanying drawing.

DETAILED DESCRIPTION

Figure 1:
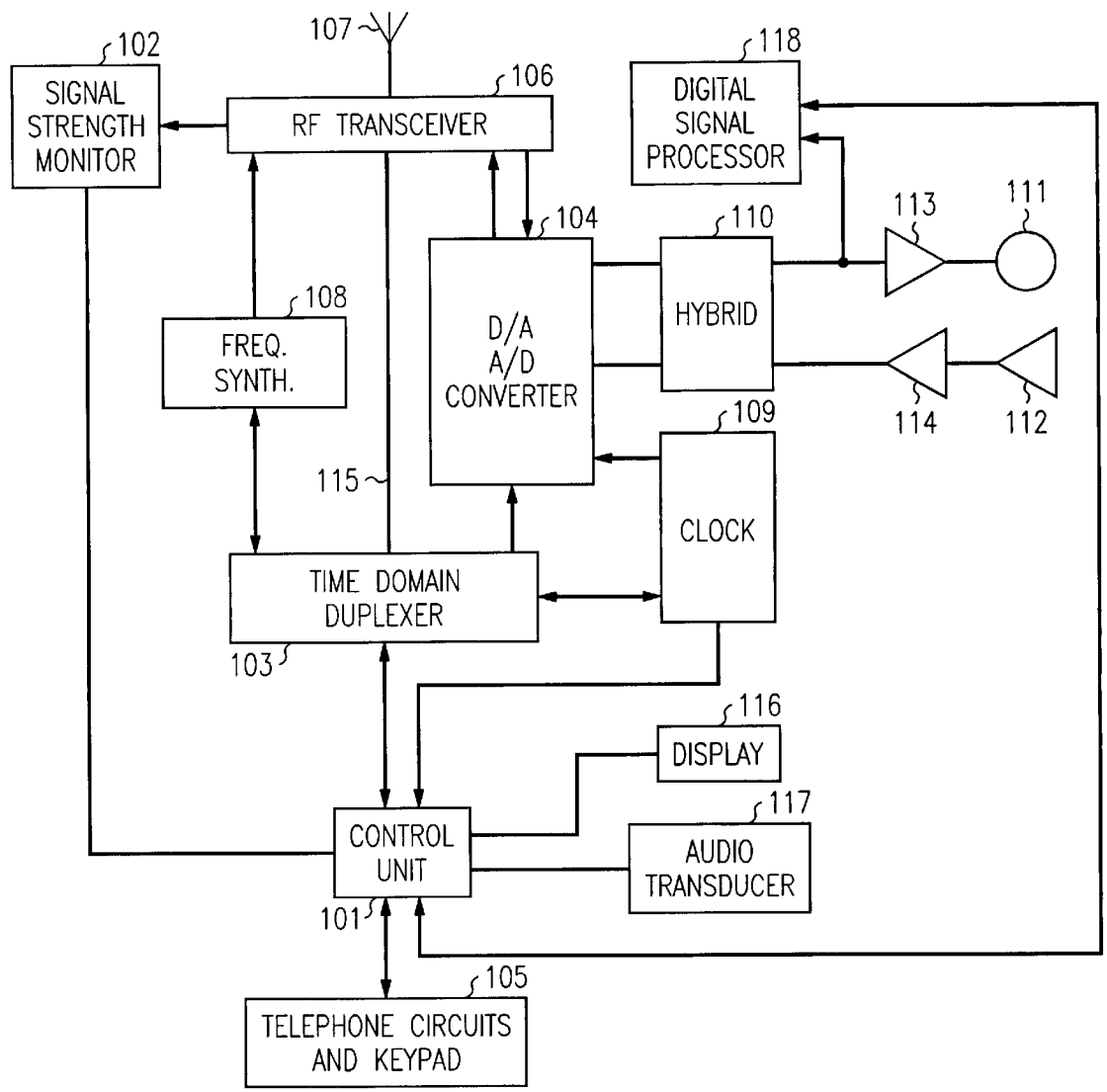
FIG. 1 illustrates, in block diagram form, a wireless telephone in accordance with the invention.

FIG. 1 illustrates a block diagram of a wireless telephone. Within the wireless telephone of FIG. 1, overall control of the wireless telephone is provided by control unit 101. Elements 102, 103, 106, 107, 108, and 109 provide the RF communication capabilities for the wireless telephone. Elements 104, 110, and 111–114 provide the audio information received and transmitted to the user; whereas, elements 116, 117, and 105 provide the basic user interface. The wireless telephone illustrated in FIG. 1 can utilize various air interfaces. One such air interface is the Common Air Interface (CAI) specification for Cordless Telephony 2 (CT2), Release 2, I-ETS300 131.

In operation, before accessing a service provider or a remote communication system, the user enters via telephone circuits and keypad 105 a single key actuation or a sequence of key actuations indicating that the user wishes to have progress tones and progress audio messages displayed as text on display 116. Control unit 101 is responsive to the input from telephone circuits and keypad 105 to enable digital signal processor 118 by transmitting a signal to digital signal processor 118. Digital signal processor 118 then monitors the audio information being transferred from hybrid 110 to ear piece 111. One skilled in the art can readily envision that digital signal processor 118 could obtain the audio information in digital form from converter 104. Upon detecting audio information, digital signal processor 118 determines if the audio information represents a progress tone or voice information. Digital signal processor 118 is responsive to either type of audio information to convert this audio information to a text defining the tone or message. This text is transmitted to control unit 108 which displays the text on display 116. After the user has finished entering login information with the service provider or remote communication system, the user can enter a single keystroke or a sequence of keystrokes on telephone circuits and keypad 105 to cause control unit 101 to disable digital signal processor 118 from determining the presence of progress tones or progress messages. Digital signal processor 118 would be disabled so as to reduce power consumption; otherwise, digital signal processor 118 could always attempt to determine the presence of a progress tone or convert speech to text for display by control unit 101 on display 116.

Figure 2:
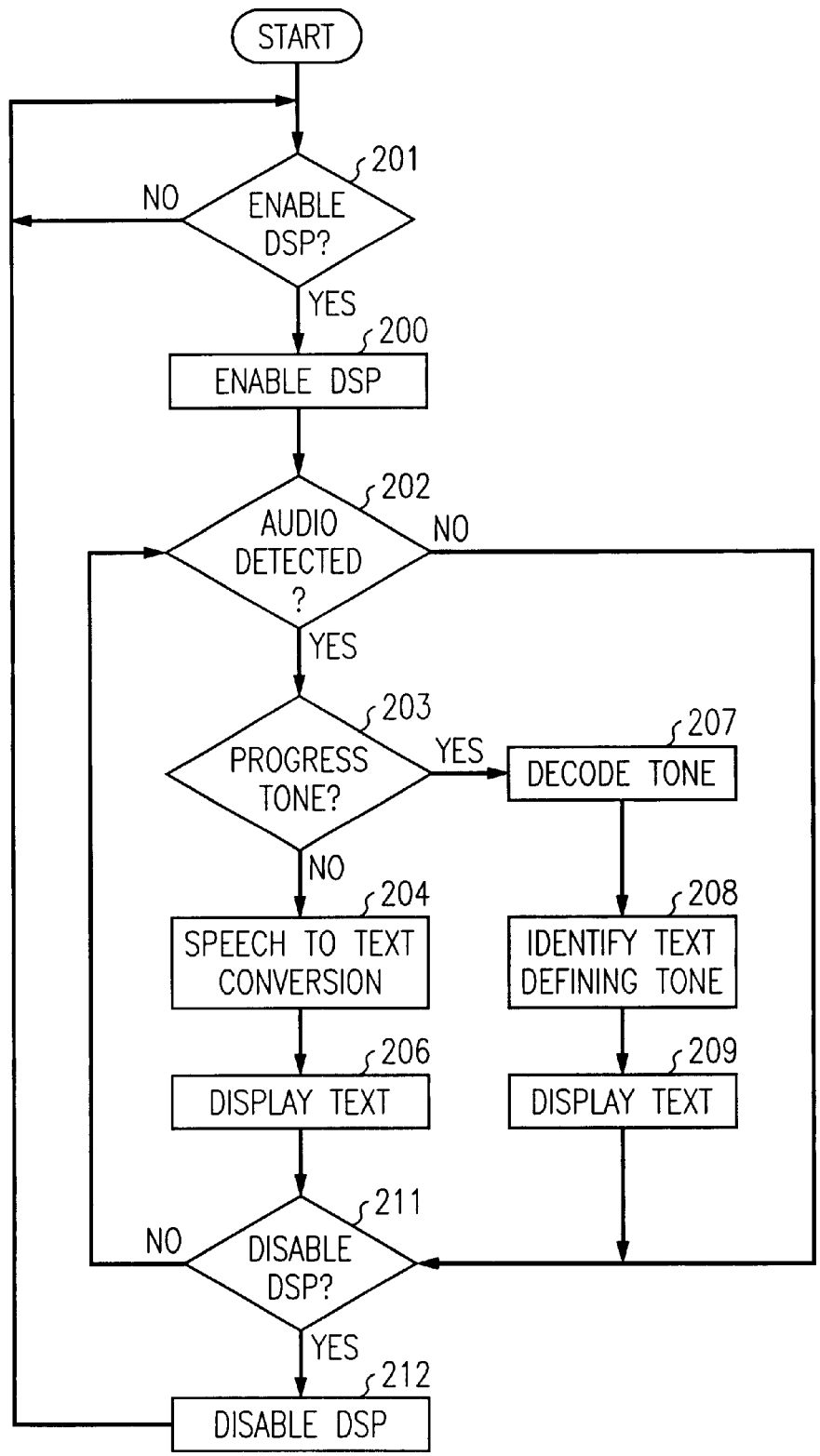
FIG. 2 illustrates, in flowchart form, the steps for implementing the invention.

FIG. 2 illustrates, in flowchart form, the steps performed by the wireless telephone of FIG. 1. Decision block 201 determines if the user wishes the DSP to be enabled. If the answer is yes, control is transferred to block 200 which enables the DSP before transferring control to decision block 202. The latter decision block determines if an audio signal is being received from hybrid 110 by digital signal processor 118. If the answer is no in decision block 202, control is transferred to decision block 211. The latter decision block determines if the user has indicated a desire to disable he DSP. If the answer is yes in decision block 211, control is transferred to block 212 which disables the operation of the DSP before transferring control back to decision block 201. If the answer in decision block 211 is no, control is transferred back to decision block 202.

Returning to decision block 203, if the answer in decision block 202 is yes, decision block 203 determines if a progress tone is being received. If the answer is yes, control is transferred to block 207 which decodes the tone before transferring control to block 208. The latter block identifies the text defining the tone, and block 209 displays this text message on display 116 before transferring control to decision block 211. If the answer in decision block 203 is no, block 204 performs a speech to text conversion using well known techniques, and block 206 displays the resulting text before transferring control to decision block 211.

Of course, various changes and modifications to the illustrative embodiments described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A method for displaying progress audio messages as text messages by a wireless terminal, comprising the steps of:
   receiving by the wireless terminal a progress audio message from a wireless switching system;
   determining by the wireless terminal a type of the progress audio message;
   decoding by the wireless terminal a progress tone upon the determined type being that of a progress tone;
   identifying by the wireless terminal a first text message for the decoded progress tone;
   displaying by the wireless terminal the identified first text message on a display that is an integral part of the wireless terminal;
   performing by the wireless terminal a speech to text conversion to obtain a second text message upon the determined type being that of a speech message; and
   displaying by the wireless terminal the converted second text message on the display that is the integral part of the wireless terminal.

2. The method of claim 1 further comprising the steps of enabling the step of determining upon detection of a first predefined sequence of key actuations on a keypad of the wireless terminal; and
   disabling the step of determining upon detection of a second predefined sequence of key actuations on the keypad of the wireless terminal.

3. The method of claim 1 wherein the step of displaying the identified first text message can display the identified first text message on a single indicator.

* * * * *